Patented Dec. 12, 1950

2,533,270

UNITED STATES PATENT OFFICE 2,533,270

ALKYD RESINS

Olive-Sue Linkletter, Englewood, and Joyce L. Johnson, Fair Lawn, N. J., assignors to Interchemical Corporation, New York, N. Y., a corporation of Ohio No Drawing. Application November 26, 1946, Serial No. 712,256

9 Claims. (Cl. 260—22)

This invention relates to the preparation of novel alkyd resins from pentaerythritol and an adduct of an alpha-unsaturated dicarboxylic acid and a terpene. The invention also relates to water-in-lacquer textile-decorating emulsions containing such novel alkyd resins, such emulsions being characterized by unusual stability, wash-fastness, and alkali-resistance.

Compositions comprising an aqueous medium, usually water, emulsified as the inner phase in an outer lacquer phase containing a film-forming binder, generally an organic solvent-soluble thermosetting resin, have gone into extensive use in the printing and the dyeing of textiles and similar fabrics. A pigment may be dispersed in the lacquer phase of such an emulsion: the application of such a pigmented water-in-lacquer emulsion in the printing of textile fabrics is disclosed in Jenett, 2,222,581 and 2,222,582 and in the dyeing of textile fabrics in Cassel, 2,248,696. Alternatively, the water-soluble dyestuff or dyestuff component may be dissolved in the aqueous phase of such an emulsion: the application of such a colored emulsion in the decoration of textile fabrics is described in Cassel, 2,202,283.

Alkyd resins of the glycerol-phthalate type are customarily included in the lacquer phase of such an emulsion, not only because of their film-forming properties but also because of their emulsifying characteristics. Such an alkyd resin can be used as the sole film-forming material in the lacquer phase, particularly of an emulsion of low solids content. It can also be used in conjunction with other film-forming materials such as thermosetting resins, the emulsions of which are not notably stable, in order to impart stability thereto. The use of these alkyd resins leaves much to be desired with respect to long-time stability of such emulsions, however; and, moreover, the resulting decorated fabric generally does not possess entirely satisfactory fastness to washing and scrubbing and satisfactory resistance to alkali.

We have now discovered that an alkyd resin especially suitable for use in textile-decorating emulsions of this type can be prepared from pentaerythritol, a high molecular weight unsaturated fatty acid having at least two double bonds, an adduct of an alpha-unsaturated dicarboxylic acid and a terpene, and a trimethylol derivative of a lower saturated hydrocarbon. Water-in-lacquer textile-decorating emulsions containing this alkyd resin in the lacquer phase are unusually stable. Moreover, not only does this particular type of film-forming alkyd resin possess exceptionally good emulsification properties; but a fabric decorated therewith exhibits an improved fastness to washing and an excellent resistance to the action of alkali.

Advantageously, in the preparation of the present alkyd resin, a partial ester of the pentaerythritol with the high molecular weight unsaturated fatty acid is first formed; and this partial ester is then heated with the dicarboxylic acid-terpene adduct and the trimethylol derivative to form the alkyd.

The unsaturated fatty acid utilized in the preparation of the partial ester may comprise any high molecular weight unsaturated fatty acid having at least two double bonds, which may or may not be conjugated. Generally, however, we prefer to use those fatty acids having from 16 to 20 carbon atoms and 2 to 4 double bonds, especially those having 18 carbon atoms and 2 to 3 double bonds, since the most satisfactory alkyds of the present type can be prepared therefrom; moreover, these unsaturated fatty acids are the most readily available in commercial quantities. Typical unsaturated fatty acids suitable for the present purpose include linoleic acid, linolenic acid, eleostearic acid and licanic acid.

Mixtures of fatty acids obtained by the saponification of those naturally occurring glycerides of predominantly unsaturated fatty acids are admirably suited for the preparation of the present alkyd. Typical examples include linseed oil fatty acids, the major portion of which consists of linoleic and linolenic acids; dehydrated castor oil fatty acids, generally considered to consist largely of 9,11-linoleic and 9,12-linoleic acids; China-wood (tung) oil fatty acids, which consist primarily of eleostearic acid; and oiticica oil fatty acids, in which licanic acid predominates. Mixtures of these drying-oil fatty acids can also be used.

The unsaturated dibasic acid-terpene adduct can be prepared by condensing in the known manner an alpha-unsaturated dicarboxylic acid with a terpene. A typical alpha-unsaturated dicarboxylic acid suitable for this purpose comprises maleic acid. Other acids such as fumaric acid, citraconic acid, and itaconic acid can also be used, however; and the anhydrides of these acids can be used in place of the acids themselves, the anhydrides being the equivalent of the acids for this purpose. The terpene may comprise a straight-chain terpene containing a conjugated system of double bonds, a monocyclic terpene whether or not its double bonds are conjugated, a bicyclic terpene, and the like.

As is well known, the nature of the adduct depends on the type of terpene utilized and the manner in which the reaction is carried out. For example, the reaction between a monocyclic terpene containing a conjugated system of double bonds and a suitable dibasic acid results in an adduct comprising a mixture of a Diels-Alder reaction product and a polymeric material. A monocyclic terpene whose pair of double bonds is not conjugated and the anhydride of a dibasic acid react, in the presence of an acid, to give a mixture of the Diels-Alder reaction product and the polymeric material, the terpene rapidly isomerizing to alpha-terpinene. In the absence of acid, however, these same reactants result in a mixture comprising an addition product of a different type and an interpolymerization product.

Generally, the terpene and the dibasic acid are reacted in approximately equimolar proportions although other ratios can also be employed. A description of the preparation of these dibasic acid-terpene adducts is given at pages 843 to 846 of Carleton Ellis' "The Chemistry of Synthetic Resins" (Reinhold Publishing Corporation, New York, 1935), to which as well as to the patents mentioned therein reference is made for further details. Any of these adducts, all of which are essentially polybasic acids, can be used in the production of the present alkyd. Adducts of this type are available commercially under the tradename of "Petrex" acids.

The trimethylol derivatives may comprise either a trimethylol ethane or a trimethylol propane. Advantageously, the trimethylol derivative comprises either 1,1,1-trimethylol ethane or 1,1,1-trimethylol propane. As is well known, these 1,1,1-derivatives can be prepared by condensing propionaldehyde or butyraldehyde, respectively, with formaldehyde.

In the formation of the partial ester, the ratio of pentaetrythritol to unsaturated fatty acid may vary from about 0.55:1 to about 0.8:1 on a molar basis. Alkyds made from such partial esters possess very good emulsification properties, and a fabric decorated with a water-in-lacquer emulsion containing such an alkyd resin exhibits satisfactory resistance to alkali. If a lower or a higher ratio of pentaetrythritol to unsaturated fatty acid is employed, then a noticeable decrease in the alkali-resistance of the decorated textile takes place. Excellent emulsification accompanied by excellent resistance to alkali of the decorated fabric is obtained when the molar ratio of pentaerythritol to unsaturated fatty acid is about 0.6:1.

The molar ratio of dibasic acid-terpene adduct to such partial ester should range from a minimum of about 0.6:1 to a maximum of about 1:1. Below this minimum ratio the decorated textile exhibits a decrease in alkali-resistance and washfastness. Above this maximum ratio the acid number of the reaction product becomes too high to be effectively brought down without a decrease in the alkali-resistance of the finished fabric.

A sufficient amount of the trimethylol derivative should be reacted so that the final alkyd resin has a theoretical free hydroxyl percentage ranging from about 1 to 3 and a maximum acid number of about 25. Below about 1% theoretical free hydroxyl, the alkyd generally possesses unsatisfactory emulsifying properties. Above about 3% theoretical free hydroxyl, the washfastness of the resulting decorated fabric is generally poor. If the alkyd has an acid number much above about 25, then the textile-decorating emulsions, especially those containing a thermosetting resin such as organic solvent-soluble melamine-formaldehyde resin, tend to be unstable and to gel rapidly. We prefer, generally, to carry out the reaction until the alkyd has an acid number of about 20 to about 25.

The partial ester should be cooked with the dibasic acid-terpene adduct and the trimethylol derivative until the resulting alkyd has a maximum gel time of about 25 seconds. (This gel time is the time in seconds required for a thin film of the alkyd resin spread on a plate, maintained at a constant temperature of 190° C. to gel or cure.) A loss in color value of the decorated textile becomes apparent if the gel time of the alkyd is much above about 25 seconds. Generally, we prefer to heat the reaction mixture until the alkyd has a gel time of about 15 to about 25 seconds.

In the preparation of the present alkyd resin, the pentaerythritol should be esterified with the unsaturated fatty acid first; and the resulting partial ester should then be cooked with the dibasic acid-terpene adduct and the trimethylol derivative. If all four reactants as such are cooked together, the pentaerythritol and the dibasic acid-terpene adduct tend to react preferentially and to form a product that precipitates out of the reaction mixture.

The partial esterification of the pentaerythritol with the unsaturated fatty acid is effected by heating to a temperature preferably not in excess of about 230° C. until the reaction has been carried to the desired extent. The reaction of the partial ester with the dibasic acid-terpene adduct and the trimethylol derivative is effected by heating to a temperature not substantially in excess of about 230° C. until the resulting alkyd has the desired acid number and gel time. Advantageously, both reactions are carried out in the presence of an inert gas such as carbon dioxide so that products of a lighter color are obtained.

The following examples illustrate the preparation of alkyd resins suitable for use in textile-decorating water-in-lacquer emulsions in accordance with our invention:

Example A 81.5 parts (0.6 mol) of pentaerythritol and 282 parts (1 mol) of dehydrated castor oil fatty acids (all parts by weight in this and other examples) are placed in a flask equipped with a stirrer, a reflux condenser, and a trap for the removal of water. The mixture is heated to a temperature of 220–230° C. and is maintained at this temperature until the acid value of the resulting partial ester is less than 5.

356 parts (1 mol) of this partial ester, 208 parts (0.97 mol) of "Petrex" acid (a terpene-maleic anhydride adduct), 48 parts (0.36 mol) of technical 1,1,1-trimethylol propane, and 5.64 parts of calcium naphthenate to catalyze the esterification are then gradually heated to 200° C., at which temperature the mixture is maintained for an hour. The temperature of the mixture is then raised to 220–230° C., which temperature is held until the reaction product has a gel time of 20 seconds on a cure plate maintained at a constant temperature of 190° C. Total cooking time is about 4 hours. The resulting alkyd resin, which has a theoretical free hydroxyl percentage of about 1.5 and an acid number of 22 to 26, is reduced to 50% solids by the addition of Solvesso

3 (an aromatic solvent naphtha having a boiling range of 139° F. to 209° F.) thereto.

This alkyd has excellent water-in-oil emulsifying properties, and water-in-oil emulsions formed therefrom possess long-time stability. Textiles decorated with such an emulsion exhibit good resistance to alkali.

*Example B*

A partial ester is prepared by heating 75 parts (0.55 mol) of pentaerythritol and 282 parts (1 mol) of dehydrated castor oil fatty acids at a temperature of 220–230° C. until the acid value of the reaction mixture is less than 5. 343 parts (1 mol) of this partial ester, 215 parts (1 mol) of "Petrex" acid, 53 parts (0.4 mol) of 1,1,1-trimethylol propane and 5.58 parts of calcium naphthenate are heated as in Example A until the reaction product has a gel time of 20 seconds and an acid number of 22 to 26. The resulting alkyd resin, which has a theoretical free hydroxyl percentage of about 1.05, is reduced to 50% solids by the addition of Solvesso #3 thereto.

Water-in-oil emulsions of entirely satisfactory stability can be prepared from this alkyd.

*Example C*

95 parts (0.7 mol) of pentaerythritol and 282 parts (1 mol) of dehydrated castor oil fatty acids are heated to form a partial ester as in Example A. An alkyd resin is then formed by heating 365.5 parts (1 mol) of this partial ester, 129 parts (0.6 mol) of "Petrex" acid, 13.4 parts (0.1 mol) of 1,1,1-trimethylol propane and 4.94 parts of calcium naphthenate in accordance with the procedure indicated in the previous examples. The heating is continued until the alkyd has a gel time of about 20 seconds and an acid number of 22 to 26. The resulting alkyd resin has a theoretical free hydroxyl percentage of about 2.9 and is reduced to 50% solids by the addition of Solvesso #3 thereto.

This alkyd similarly imparts improved stability to water-in-oil emulsions.

*Example D*

A partial ester is prepared by heating 109 parts (0.8 mol) of pentaerythritol and 282 parts (1 mol) of dehydrated castor oil fatty acids in accordance with the procedure outlined in the previous examples. 380 parts (1 mol) of this partial ester, 193 parts (0.9 mol) of "Petrex" acid, 20.1 parts (0.15 mol) of 1,1,1-trimethylol propane and 5.73 parts of calcium naphthenate are then heated as in Example A to form an alkyd resin having a gel time of about 20 seconds, a theoretical free hydroxyl percentage of about 2.4 and an acid number of 22 to 26. The resulting alkyd is reduced to 50% solids by the addition of Solvesso #3 thereto.

This alkyd also possesses excellent emulsifying properties, and water-in-oil emulsions of satisfactory stability can be prepared therefrom.

*Examples E to H*

Linseed oil fatty acids can be substituted for the dehydrated castor oil fatty acids of Examples A to D on the same weight and hydroxyl basis, the molecular weights of the two fatty acid mixtures being substantially identical, namely, approximately 282. In each case the procedure for preparing the partial ester and then the alkyd is substantially the same as that described in Examples A to D, respectively.

*Example I*

An alkyd suitable for the present purpose can be prepared by replacing the 48 parts of 1,1,1-trimethylol propane of Example A with 40 parts (0.33 mol) of 1,1,1-trimethylol ethane.

*Example J*

47.2 parts (0.39 mol) of 1,1,1-trimethylol ethane can be substituted for the 53 parts of 1,1,1-trimethylol propane of Example B.

*Example K*

The 13.4 parts of 1,1,1-trimethylol propane of Example C can be replaced by 12 parts (0.1 mol) of 1,1,1-trimethylol ethane.

*Example L*

In place of the 20.1 parts of 1,1,1-trimethylol propane of Example D, 18 parts (0.15 mol) of 1,1,1-trimethylol ethane can be used in the preparation of the alkyd resin.

*Examples M to P*

As in Examples E to H, linseed oil fatty acids can be substituted for the dehydrated castor oil fatty acids of Examples I to L on the same weight and hydroxyl basis.

The use of such an alkyd resin in the preparation of a water-in-lacquer vehicle concentrate suitable for use in the preparation of textile-decorating emulsions is illustrated by the following example:

*Example I*

A vehicle concentrate is prepared by mixing together the following ingredients:

| | |
|---|---|
| 50% solids resin solution of Example A | 40 |
| Solvesso #100 (highly aromatic solvent naphtha having a boiling range of 310 to 365° F.) | 10 | and emulsifying into the resulting lacquer:

| | |
|---|---|
| 10% aqueous solution of diammonium phosphate | 30 |
| Water | 20 |

The resins of Examples B to P can be similarly formulated into vehicle concentrates.

This vehicle concentrate can be thinned or cut by the addition of further organic solvent thereto and the emulsification of further water thereinto in the proportions necessary to give a textile-decorating vehicle having the body and the viscosity desired:

*Example II*

A textile-decorating vehicle or clear having a solids content of 1% is prepared from the following ingredients:

| | |
|---|---|
| Vehicle concentrate of Example I | 5 |
| Mineral spirits | 20 |
| Water | 75 |

The resulting emulsion is unusually stable and retains its stability for a prolonged period of time.

*Example III*

A textile-decorating vehicle or clear having a solids content of 0.4% is prepared from the following ingredients:

| | |
|---|---|
| Vehicle concentrate of Example I | 2 |
| Mineral spirits | 23 |
| Water | 75 |

This water-in-lacquer emulsion is also unusually stable. When tested on a press, this emulsion ran for over 5 hours without any sign of a change; in comparison, similar emulsions prepared from the customary glycerol-phthalate alkyds have an average length of stability under similar conditions of only 2½ to 3 hours before thickening occurs.

The solution of the alkyd resin can also be cut directly to form such a clear:

Example IV

A clear having a solids content of 1% is prepared by mixing the following:

| | |
|---|---|
| 50% solids resin solution of Example A | 2 |
| Mineral spirits | 23 | and emulsifying into the resulting lacquer:

| | |
|---|---|
| 10% aqueous solution of diammonium phosphate | 5 |
| Water | 70 |

Textile-decorating compositions can be prepared from such vehicles or clears by mixing a color concentrate containing a pigment or a water-soluble dyestuff therewith. The proportions in which the respective color concentrate and the respective vehicle are mixed depend, of course, on the depth of shade desired in the finished fabric. Typical textile-decorating compositions are illustrated by the following examples:

Example 1

A pigmented color concentrate or ink comprising a water-in-lacquer emulsion consisting of the folllowing ingredients:

| | |
|---|---|
| Pigment | 9 to 40 |
| Organic solvent-soluble urea-formaldehyde or melamine-formaldehyde resin | 9 to 30 |
| Fatty acid (to disperse the pigment and the resin) | 1 |
| Water | Up to 10 |
| Solvesso #100, turpentine and/or pine oil | Balance |
| | 100 | is mixed with the vehicle clear of Example II, III, or IV in proportions within the range of 1:1 to 1:150 to produce a water-in-lacquer textile printing paste, the particular ratio depending on the depth of shade desired.

A fabric, printed with this composition and dried by heat to cure the resins, is satisfactorily scrubfast, washfast and light-washfast and possesses good resistance to alkali.

Example 2

A textile-decorating composition containing a water-soluble dyestuff in the aqueous phase is prepared by mixing together the following:

| | |
|---|---|
| 50% solids resin solution of Example A | 2 |
| Mineral spirits | 48 | and emulsifying into the resulting lacquer:

| | |
|---|---|
| 10% aqueous solution of a water-soluble dye or dyestuff component | 40 |
| Water | 110 |

The color strength can be varied by changing the proportion of aqueous dyestuff solution.

Compared with the customary glycerol-phthalate type of alkyd, the present alkyd resin produces water-in-oil emulsions that possess far superior stability and that remain stable for far longer periods of time. The colored water-in-lacquer emulsions containing the present alkyd are similarly far more stable and remain usable (printable or dyeable) for a much longer period of time than the same type of emulsions formulated from the ordinary glycerol-phthalate alkyd. The resistance of a fabric decorated with the present alkyd-containing emulsion to washing and especially to the action of alkali is definitely superior to that of a fabric decorated with the usual glycerol-phthalate alkyd-containing emulsion.

The present alkyd exhibits a similar superiority for use in water-in-lacquer textile-decorating emulsions even over similarly prepared alkyds such as those made from a trimethylol propane, an unsaturated oil fatty acid, and phthalic acid or an alpha-olefinic dibasic acid and described in the copending application of Olive-Sue Linkletter, S. N. 517,113, filed January 5, 1944, now abandoned. In particular, the present specific type of alkyd is especially characterized by its superior emulsification properties and by the superior alkali-resistance exhibited by a fabric decorated with an emulsion containing it. The finished fabric, in addition, possesses an improved color value.

The presence of both the pentaerythritol and the trimethylol derivative is necessary for the production of superior alkali-resistance in a fabric decorated with the present water-in-lacquer emulsion. Moreover, if the trimethylol derivative is omitted, then the resulting alkyd has too high an acid number; and the use of such an alkyd in a textile-decorating emulsion containing a thermosetting resin such as a melamine-formaldehyde resin causes the emulsion to gel very rapidly.

The substitution of glycerol or glycol for the trimethylol derivative results in a loss of color value and a decrease in the alkali-resistance of a fabric decorated with an emulsion containing the resulting alkyd. In addition, water-in-lacquer emulsions made from such a glycerol-containing alkyd are too thin to be satisfactory, especially for use in printing.

Pentaerythritol can not be successfully substituted for the trimethylol derivative, for then the reaction mixture gels too quickly during the cooking with the production of a resin having too high an acid number. Moreover, emulsions made from the resulting resin are too thin, and fabrics decorated with such emulsions possess a poor color value.

The replacement of pentaerythritol by glycerol results in an alkyd, the emulsions of which give prints of lessened color value.

Although unusually stable water-in-lacquer emulsions can be prepared from the present alkyd, satisfactory lacquer-in-water emulsions have not been formulated therefrom.

We claim:

1. An alkyd resin consisting essentially of the reaction product of (1) a partial ester of 0.55 to 0.8 mol of pentaerythritol with 1 mol of a high molecular weight unsaturated fatty acid having from 16 to 20 carbon atoms and 2 to 4 double bonds, (2) an adduct of an alpha-unsaturated dicarboxylic acid and a terpene, and (3) a trimethylol derivative selected from the group consisting of 1,1,1-trimethylol ethane and 1,1,1-trimethylol propane, the molar ratio of the adduct to the partial ester ranging from 0.6:1 to 1:1, said alkyd resin having a free hydroxyl percentage ranging from 1 to 3, a maximum acid number of 25, and a maximum gel time of 25 seconds on a cure plate maintained at a temperature of 190° C.

2. The alkyd resin as claimed in claim 1, in which the unsaturated fatty acid has 18 carbon atoms and 2 to 3 double bonds.

3. The alkyd resin as claimed in claim 1, in which the adduct comprises a maleic acid-terpene adduct.

4. The alkyd resin as claimed in claim 1, in which the trimethylol derivative comprises 1,1,1,-trimethylol propane.

5. The alkyd resin as claimed in claim 1, in which the unsaturated fatty acid comprises dehydrated castor oil fatty acids.

6. An alkyd resin consisting essentially of the reaction product of (1) a partial ester of 0.55 to 0.8 mol of pentaerythritol with 1 mol of dehydrated castor oil fatty acids, (2) an adduct of maleic acid and a terpene, and (3) 1,1,1-trimethylol propane, the molar ratio of the adduct to the partial ester ranging from 0.6:1 to 1:1, said alkyd resin having a free hydroxyl percentage ranging from 1 to 3, a maximum acid number of 25, and a maximum gel time of 25 seconds on a cure plate maintained at a temperature of 190° C.

7. A water-in-lacquer textile-decorating emulsion, the lacquer phase of which comprises the alkyd resin, as defined in claim 1, dissolved in a vaporizable water-immiscible organic solvent therefor.

8. A water-in-lacquer textile-decorating emulsion, the lacquer phase of which comprises the alkyd resin, as defined in claim 6, dissolved in a vaporizable water-immiscible organic solvent therefor.

9. A water - in - lacquer textile - decorating emulsion, the lacquer phase of which comprises the alkyd resin, as defined in claim 6, dissolved in a solution of a thermosetting synthetic resin in a vaporizable water-immiscible organic solvent therefor.

OLIVE-SUE LINKLETTER.
JOYCE L. JOHNSON.

REFERENCES CITED

The following references are of record in the file of this patent:

UNITED STATES PATENTS

| Number | Name | Date |
|---|---|---|
| 2,222,581 | Jenett | Nov. 19, 1940 |

FOREIGN PATENTS

| Number | Country | Date |
|---|---|---|
| 468,542 | Great Britain | July 7, 1937 |

OTHER REFERENCES

Burrell, Ind. Eng. Chem., vol. 37, pages 86–89, Jan. 1945.